Patented Feb. 16, 1954

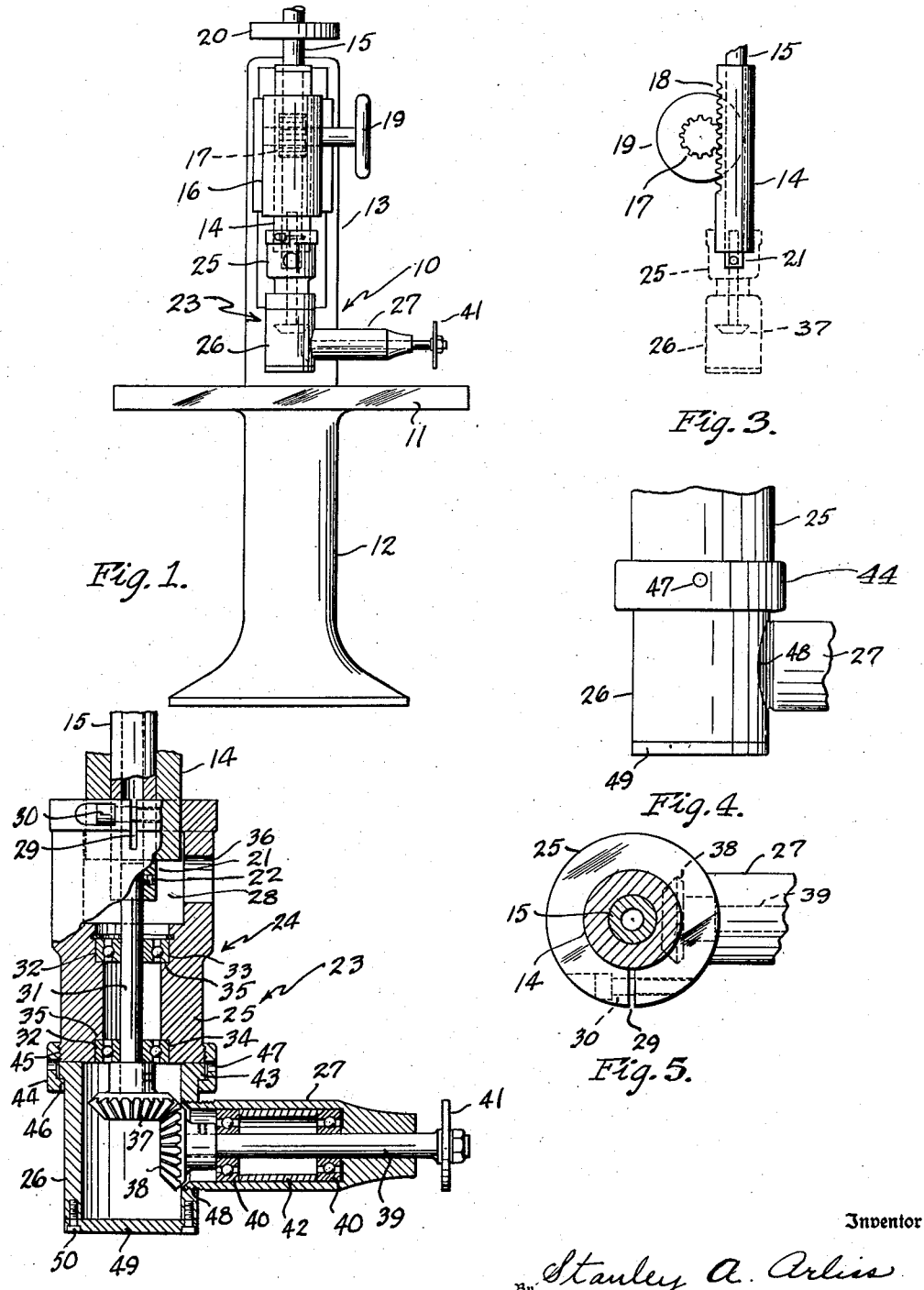

2,669,162

UNITED STATES PATENT OFFICE 2,669,162

AUXILIARY TOOL ADAPTER FOR DRILL PRESSES

Stanley A. Arliss, Long Hill, Conn.

Application November 1, 1948, Serial No. 57,773

2 Claims. (Cl. 90—17)

This invention relates to an auxiliary tool adapter for drill presses, and has for an object to provide such a device or adapter which will permit the use of different tools, such, for example, as a milling cutter, saw, grinding wheel or the like on a drill press.

Another object is to provide a device of this character in which the tool may be swung to any angle with respect to the vertical axis of the drill press spindle.

Another object is to provide such a device which may be easily and quickly applied to and removed from the drill press spindle, and in which the tool will be operated by the tool driving or operating shaft of the drill press.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a front elevation of a drill press showing this device attached;

Fig. 2 is a section on a larger scale of the adapter;

Fig. 3 is a detail view showing the adjusting means for the drill press spindle;

Fig. 4 is a side elevation of a portion of the adapter, and

Fig. 5 is a top plan view thereof.

A general type of drill press is shown somewhat diagrammatically at 10 in Fig. 1, including the work table 11 on which the work to be operated on is held, the usual stand or base 12, and the upright housing or support 13 on which is mounted the head 16 in which are the usual vertically adjustable spindle 14 and the tool operating shaft 15. The spindle 14 is slidable up and down in the head 16 mounted on the housing or support 13 by means of a gear 17 meshing with a rack 18 on the spindle, usually operated by hand, as, for example, by a hand wheel 19, or a hand lever if preferred. Mounted in the spindle is the tool operating shaft 15 operated by any suitable drive such, for example, as an electric motor (not shown) or a pulley 20 over which a belt may run from any suitable driving shaft, and carrying at its lower end any suitable chuck 21 for securing the drill. To simplify the drawing this chuck is shown merely as an open socket to receive the shank of the drill with a set screw 22 for securing the shank. It will be understood that in the use of this press as a drill press the drill is clamped in this chuck, and rotation of the shaft 15 rotates the drill, which is fed into the work on the table 11 by a lever or the hand wheel 19, which slides the spindle 14 and the shaft 15 up and down.

This new device or adapter comprises an attachment 23 which is secured to the lower end of the spindle 14 so that it may be fed up and down by the shifting of the spindle 14. It comprises a housing 24, in this case including an upper section 25, an intermediate section 26, and a branch section 27. The upper end of the section 25 is provided with a pocket 28 opening through its upper end to receive the lower end of the spindle 14, as shown in Figs. 1 and 2, and in this construction this upper end is a split section, the separating slot being shown at 29, with a clamping screw 30 extending across this slit or slot, so that after sliding this end or head portion and pocket over the lower end of the spindle 14, as shown in Fig. 2, it is clamped to this spindle by tightening up the screw 30. It will be understood that it may be mounted at any desired angle about the axis of the spindle 14 by merely loosening the screw 30, turning the housing to the angle desired, and then again tightening up the screw.

In this upper section of the housing is a vertical shaft 31 mounted in suitable bearings 32, and it is preferred that these are anti-friction bearings, such as ball bearings, as shown, the upper bearing being mounted in an enlarged recess 33 at the bottom of the pocket 28, while the lower bearing is mounted in a similar counterbore or recess 34 in the lower end of the section 25, and rigidly supported on the shoulder 35 at the bottom of these recesses. When the housing is secured on the spindle 14 the upper end of the shaft may be inserted in the chuck 21 on the lower end of the drive shaft 15 and secured by this chuck. The section 25 is provided with one or more openings 36 in alignment with this chuck for insertion of a wrench or other tool to operate the clutch or chuck to grip the shaft, the securing means in the present showing being the set screw 22. Mounted on the lower end of this shaft is a bevel gear 37 in the intermediate section 26 meshing with another bevel gear 38 on a horizontal shaft 39 in the horizontal arm or section 27 of the housing, this shaft being mounted in suitable bearings 40 which are also preferably anti-friction or ball bearings. This shaft projects from the end of the section 27 and on this exposed end carries the auxiliary tool 41 which may be any one of several different types of tools, such, for example, as a saw, milling cutter, grinding wheel or the like. The bearings 40 are held in the proper spaced relation by a suitable spacing sleeve 42.

The section 26 of the housing is so secured to the section 25 that the lateral section or arm 27 may be turned to various angles about the axis of the section 25 and shaft 31. For this purpose, the upper end of the section 26 is provided with a peripheral flange 43 on its outer side embraced by a clamping sleeve or ring 44 threaded to the lower end of the section 25 at 45 and provided with an internal flange 46 engaging under the flange 43. Thus, by turning the sleeve 44 the flange 46 by pressing against the flange 43 will securely clamp the upper end of the section 26 against the lower end of the section 25. By merely loosening the sleeve 44 the laterally extending arm or section 27 may be swung to any desired angle about the section 25 and shaft 31. To facilitate operating of the clamping ring or sleeve 44 it may be provided with flat surfaces or made noncircular, or, as in the present showing, provided with openings 47 for insertion of a tool for turning this sleeve. The laterally extending section 27 may be mounted in the section 26 by threading its inner end into a side opening in the section 26, as shown at 48. To facilitate access to the interior of the housing and also to facilitate inspection or assembly of the device the lower end of the section 26 is preferably left open and closed by a cover or closure 49, secured in position by any suitable means, such as the screws 50. The lower portion of the section 25 and intermediate and branch sections 26 and 27 may be kept filled with suitable lubricant such as oil or grease for the bearings and the gears.

It will be understood from the above that when this adapter or attachment is in position the shaft 31 is driven by the drill press shaft 15, and through the gears 37 and 38 operates the shaft 39 and the tool 41 carried thereby. This tool is vertical, so that if it is a saw it can be used for making saw cuts, or if it is a milling cutter for making milling cuts, or if it is an abrasive wheel it can be used for surface or other grinding. It can be raised and lowered to and from operative position by raising and lowering the drill press spindle 14 through its adjusting means 19. This horizontal arm 27 with the tool 41 may be swung to any angular position about the axis of the spindle 14, either by loosening the screw 30 and turning the whole device to the angle desired, and then reclamping the screw, or the lateral arm or section 27 may be similarly swung independently of the section 25 by loosening the clamping ring 44, turning the arm to the desired angle, and then retightening this ring. It will also be apparent the device may be very easily and quickly applied to or removed from the spindle 14 and easily and quickly secured in proper operative position; that is of very simple and rigid construction and may be used for performing a number of operations and operating a number of different tools not ordinarily performed or used on a drill press, and therefore for certain operations will make it unnecessary for the shop owner to install other machines for these operations.

Having thus set forth the nature of my invention, I claim:

1. An auxiliary tool adapter for drill presses including an upright adjustable spindle and an upright drill shaft, said adapter comprising a housing including an upright portion and a horizontal laterally projecting arm, means for securing said upright portion to the spindle for movement therewith, an upright shaft in said upright portion of the housing with its upper end in position to be secured to the drill shaft for operation thereby, bearings for said shaft in the upright portion, a horizontal shaft in said arm, bearings for said latter shaft in the arm, driving gears connecting the shafts and located in the junction between the upright portion and said arm, means on the horizontal shaft for mounting a tool thereon, said housing also including an intermediate portion to which said arm is connected, said upright portion of the housing and said intermediate portion being provided with lower and upper abutting ends respectively, one of said abutting ends being provided with an outer flange and the other being externally threaded, and a clamping ring screwed onto said threaded portion and provided with an inturned flange engaging the outer flange to clamp said ends together.

2. An auxiliary tool adapter for drill presses including an upright adjustable spindle and an upright drill shaft, said adapter comprising a housing including an upright portion and a horizontal laterally projecting arm at the lower end thereof, means for securing said upright portion to the spindle for movement therewith, an upright shaft in said upright portion of the housing with its upper end in position to be secured to the drill shaft for operation thereby, bearings for the shaft in said upright portion, a horizontal shaft in said arm, bearings for the latter shaft in said arm, driving gears connecting the shafts located at the junction between said upright and horizontal portions, means on the horizontal shaft for mounting a tool thereon, and means securing the arm to the upright portion of the housing for swinging movements about the axis of the upright shaft and securing it in different angular positions including an intermediate portion of the housing between the upright portion and the arm, said upright and intermediate portions being provided with abutting ends, a clamping ring mounted to turn on one of said portions, and said ring and the other portion having cooperating shoulders to clamp said abutting ends together in different angular positions by turning movement of the ring.

STANLEY A. ARLISS.

References Cited in the file of this patent

UNITED STATES PATENTS

| Number | Name | Date |
| --- | --- | --- |
| 1,029,402 | Ritter | June 11, 1912 |
| 1,627,934 | Stein | May 10, 1927 |
| 2,183,166 | Palumbo | Dec. 12, 1939 |
| 2,363,444 | Shipman | Nov. 21, 1944 |